Jan. 3, 1956  L. G. DEJEAN  2,729,495
DEVICES FOR CONNECTING A LOAD TO A PARACHUTE
Filed Oct. 16, 1951  2 Sheets-Sheet 1
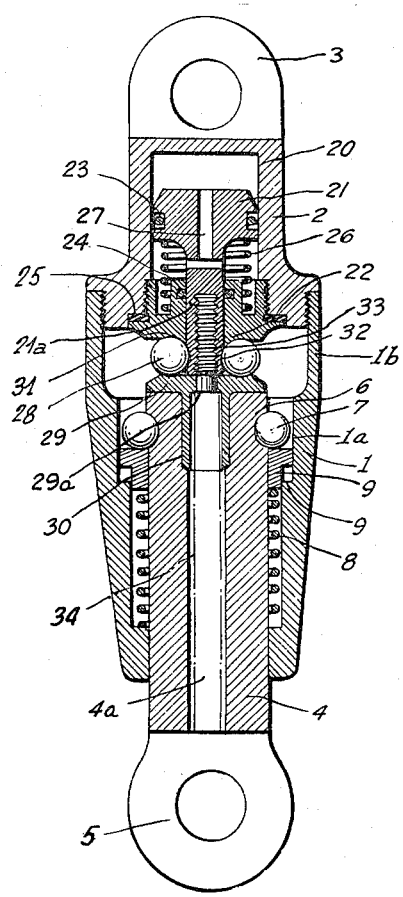
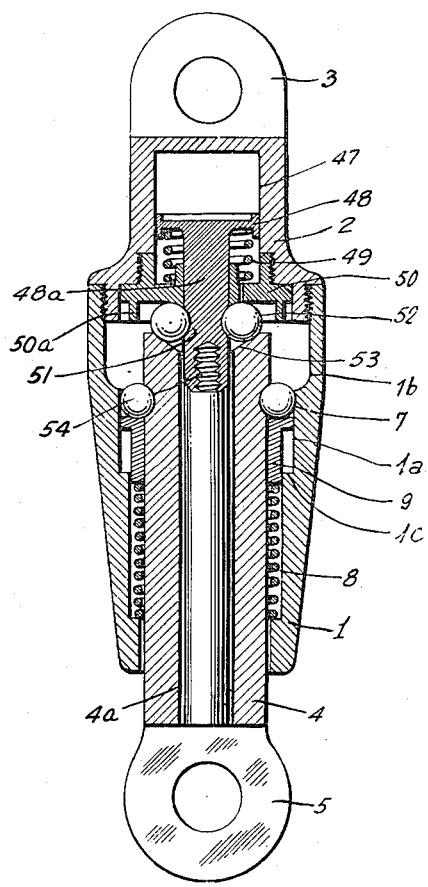
Lucien G. Dejean
By Churchill, Rich, Weymouth & Engel
Attys

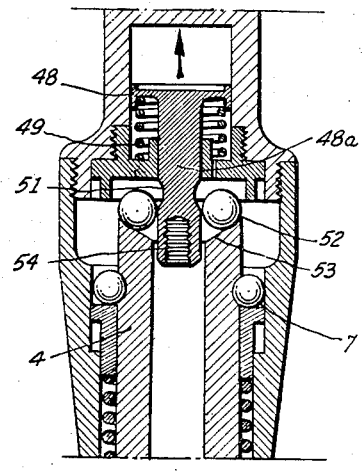
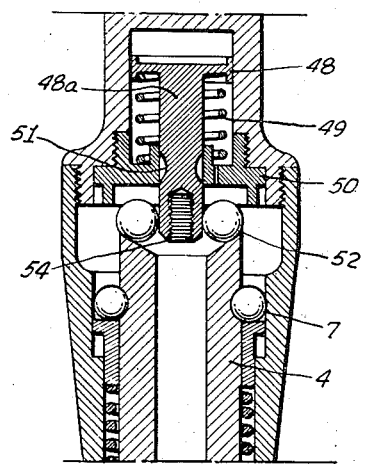
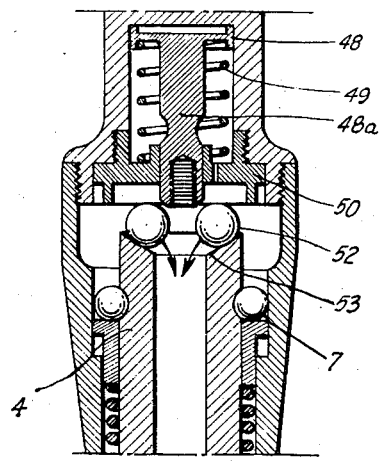

United States Patent Office 2,729,495
Patented Jan. 3, 1956

2,729,495

DEVICES FOR CONNECTING A LOAD TO A PARACHUTE

Lucien G. Dejean, Paris, France, assignor to Societe Nationale de Constructions Aeronautiques du Sud-Ouest (Societe Anonyme), Paris, France, a company of France Application October 16, 1951, Serial No. 251,527

Claims priority, application France October 23, 1950

9 Claims. (Cl. 294—83)

The present invention relates to improvements in automatic load releasing connectors for parachutes and has particular reference to connector devices of the type including two slidably associated members to be connected respectively to the load and to the parachute, balls cooperating with appropriate recesses and forming latching means for preventing separation of the two members, a spring urging said members to such a relative position that the balls are no longer in latching state, and locking means for securing the members together and keeping the spring under stress, the arrangement being such that the sudden pull exerted by the load as the parachute opens up causes the members to be unlocked, the drag of the load then keeping the spring under stress, so that, as soon as the drag of the load cancels, as the load hits the ground, the spring brings about release of the connector device.

In conventional devices of this type, there is always a danger of untimely release during descent of the parachuted load.

However such devices bear a serious drawback. When the parachute opens, the transfer of the weight of the load thereto takes place in a rather sudden manner, and thus the parachute-slings resiliently extend, then, acting as springs, they entail a rebound of the load. Toward the end of this rebound, the pull exerted by the load can drop to a value lower than the stress of the spring and the two members may become unlatched thus causing the load to fall freely.

The main object of the present invention is to provide a connector device of the above type, which will only release when the drag exerted by the load eventually cancels, as the load hits the ground, but which will not release if the drag casually decreases or cancels, just after the parachute opens up.

In general terms, the connector device, according to the invention, includes movable abutting means cooperating with damping means, such as a dash-pot, having a piston-like part forming a movable stop for one of the two component members of the connector device, and a cylinder-like part associated with the other component member, the volume bounded by said parts being filled with a fluid such as a liquid or air.

Other objects and advantages of the invention will be apparent during the course of the following description.

Fig. 1 is an axial section of a device including a liquid containing dash-pot.

Fig. 2 is a similar section of a further embodiment including an air containing dash-pot.

Figs. 3, 4 and 5 are fragmentary sections showing this embodiment in course of operation.

The devices shown in Figs. 1 and 2 comprise a tubular casing 1 closed, at its upper end, by a hollow threaded plug or cylinder 2 carrying an eye 3 designed for connection to a parachute. A generally cylindrical rod 4 is slidably fitted into the lower part of the casing 1 and is provided at its bottom end with a fork-joint 5 designed for connection to a load. In both embodiments, the rod 4 has an axial duct 4a and the two flanges of the fork-joint 5 are symmetrically located about this duct. Toward its top end, the rod 4 is formed with a circumferential groove 6, or a plurality of spherical recesses, adapted to be engaged by balls 7. The latter are urged by a spring 8 through a ring 9 inserted therebetween and freely sliding around the rod 4.

When the devices are in the position shown in Figs. 1 and 2, the balls 7 are secured, by the restricted bore 1a of the casing 1, in the groove 6, so that the rod 4 cannot be loosened from the casing 1. On the other hand, if the spring 8 is allowed to expand, the balls reach the widened portion 1b and thus release the rod 4 which, being subjected to a pull, can move apart from the casing 1.

The ring 9 has a shoulder which prevents an excessive pull exerted, in opposite directions, on the connecting members 3 and 5, from causing complete crushing of the spring 8, as this would impair its proper operation. Indeed, when the pull reaches a certain value, the shoulder of the ring 9 abuts against a shoulder 1c of the casing 1.

In the embodiment of Fig. 1, the plug 2 comprises a cylindrical bore 20 along the longitudinal axis of the casing 1 and inside which a piston 21 can slide. This piston is provided with a stem 21a arranged across a plug 22 closing the bore 20. This bore is entirely filled with liquid and liquid-tight joints 23, 24 and 25 ensure tightness of this bore.

The piston is urged towards the top of the figure, by a spring 26. It is crossed by a narrow, calibrated duct 27 allowing the liquid to flow between its two faces. Balls 28 are held between the outer face of the plug 22 and a support member 29 having an axial duct and being frictionally engaged into the axial duct 30 of the rod 4.

In the position shown in Fig. 1, the balls 28 are held, owing to the pressure exerted by the spring 8, on the one hand in spherical housings 31 located on the outer face of the plug 22, and on the other hand in a circumferential groove 32 located in the vicinity of the end of the piston-rod 21a.

At rest, the piston 21, in spite of the fact it is urged by the spring 26, cannot move, owing to the presence of the balls 28 in the groove 32.

When, as the parachute opens up, a sudden pull is exerted on the rod 4, the spring 8 is compressed, the balls 28 are liberated and fall into the casing 1. Hence, the piston 21 urged by the spring 26, starts moving slowly owing to the presence of the liquid, towards the top of the figure. As long as this displacement is not completed, the two parts of the device cannot move apart since, even if the pull exerted in opposite directions on the members 3 and 5 happens to disappear, the stem 4 abuts against the end of the rod 21a. Therefore, as long as this stem is not retracted, the balls 7 cannot reach the widened portion 1b.

For assembling this device, an auxiliary threaded rod 34 is used, which is provided with a shoulder which presses against the rim 29a of the boring through the upper part of the member 29. This rod is screwed into the threaded cavity 33 and allows of securing the support member 29 to the end of the stem 21a. It is thus possible to fit up the balls 28 which are held in position owing to the force exerted by the spring 26. The upper part 2 of the device together with the balls 28 and the support member 29, can thus be assembled. The lower part of the device having been independently fitted up, the upper part is then screwed to this lower part, and the auxiliary threaded rod 34 removed.

The embodiment shown in Fig. 2 is similar to that of Fig. 1 as regards the upper part. The plug 2 again comprises a cylindrical bore 47 inside which a piston 48 can slide. But here, the bore only contains atmospheric air. This piston is urged by a spring 49 abutting against an auxiliary plug 50 closing the lower part of the bore 47. This plug is crossed by the piston-stem 48a which bears a circumferential groove 51 into which balls 52 are engaged. The hollow rod 4 ends with a frusto-conical cup 53 which, owing to the pressure of the spring 8, is pressed against the balls 52 in the position of rest shown in Fig. 2. The piston 48 held by the balls which are thus chocked up, cannot as a result, at rest, move under, the influence of the spring 49. These same balls prevent the rod 4 from rising and hence the balls 7 from getting loose.

When the parachute opens up, the rod 4 (see Fig. 3) is subjected to a pull which drags it down, so that the balls 52 are disengaged from the groove 51. The piston 48 can then move under the influence of the spring 49. However, the balls 52 remain enclosed in the annular space, around the stem 48a, included between the lower face of the plug 50 and the cup 53. In particular, the rim 50a of the lower face of the plug 50 prevents the balls 52 from entering the widened portion 1b.

Hence, as it may be seen in Fig. 4, even if the pull on the rod 4 completely disappears, the latter cannot move sufficiently upwards for liberating the balls 7.

When the piston 48 reaches the end of its stroke (see Fig. 5), the balls 52 run out of the device by passing through the axial duct inside rod 4. The upward movement of the rod 4 becomes therefore possible and the device operates as indicated above.

For fitting up this device, a threaded bore 54 is provided at the end of the stem 48a, this allowing of introducing an auxiliary rod into the axial duct of rod 4 for moving the piston 48 to the fitting up position. The plug 2 may then be screwed on the casing 1, either in the position shown in Fig. 2 or in the reverse position.

In the embodiment of Fig. 1, when the pull exerted on the members 3 and 5 cancels, the stem 21a directly undergoes the thrust exerted by the rod 4. It is therefore necessary that the bore 20 contains an incompressible fluid. On the contrary, in the embodiment of Fig. 2, the thrust of the rod 4 is exerted on the balls 52 as long as these balls have not fallen through the duct 4a. The fluid inside the bore 47 is merely used in this case for braking the piston 48 during its upward motion. It is therefore possible to use atmospheric air in the bore, as damping fluid.

What I claim is:

1. The combination with a connector device of the type comprising a tubular casing, a slidable member extending into said casing, means associated with the casing and the member to lock same in certain relative positions thereof and to release the member from the casing when the member is moved inwardly of the casing to a predetermined position, and means within the casing engaging said member and tending to move it inwardly of said casing to said predetermined position, of a retarding device for limiting inward displacement of said member, comprising a cylinder forming an extension of said casing and having a closed end, a piston movable inside said cylinder and cooperating with said member to prevent displacement thereof to said predetermined position when said piston is remote from said end and to permit displacement of said member to said predetermined position when said piston is proximate to said end, means for urging said piston toward said end, and a fluid inside said cylinder between said end and said piston to damp the motion of said piston.

2. The combination of claim 1, wherein the fluid is atmospheric air.

3. The combination of claim 1, further comprising passage means through the piston for allowing flow of said fluid therethrough at a predetermined rate.

4. The combination of claim 3, wherein the fluid is a liquid.

5. The combination of claim 8, wherein the inner end of the slidable member has a surface inclined toward the longitudinal passage.

6. The combination of claim 1, further comprising means connecting the casing and the piston to lock said piston in a position remote from said end of the cylinder.

7. The combination of claim 6, wherein the means for locking the piston to the casing include a part immovable with respect to the casing, a stem integral with the piston and having a recessed surface, and a ball engaging said recessed surface and chocked up between said part and the inner end of the slidable member urged inwardly of the casing.

8. The combination of claim 7, wherein the slidable member includes a longitudinal passage and the stem freely engages the walls of said passage.

9. The combination of claim 1, wherein a portion of the piston is adapted to prevent displacement of the member through direct abutting engagement therewith.

References Cited in the file of this patent

UNITED STATES PATENTS

| | | |
|---|---|---|
| 2,400,165 | Porter | May 14, 1946 |
| 2,413,450 | Johnsen | Dec. 31, 1946 |
| 2,420,746 | Heidman et al. | May 20, 1947 |
| 2,435,444 | Johnsen | Feb. 3, 1948 |
| 2,483,044 | Gongwer | Sept. 27, 1949 |
| 2,562,459 | Hoey | July 21, 1951 |